Dec. 8, 1936.　　　H. W. MULLER　　　2,063,822
PLANT PROTECTIVE DEVICE
Filed Jan. 3, 1936　　　2 Sheets-Sheet 1

Henry W. Muller,
INVENTOR
BY Victor J. Evans & Co.
ATTORNEY

Dec. 8, 1936. H. W. MULLER 2,063,822
PLANT PROTECTIVE DEVICE
Filed Jan. 3, 1936  2 Sheets-Sheet 2
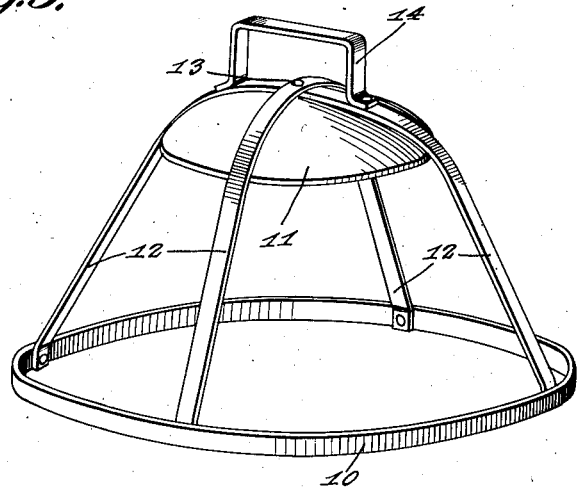
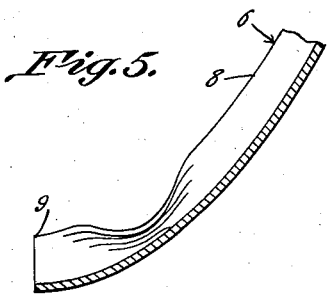
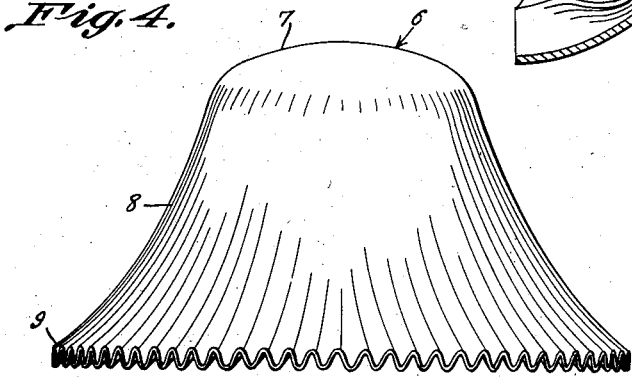
Henry W. Muller,
INVENTOR
BY Victor J. Evans & Co.
ATTORNEY Patented Dec. 8, 1936

2,063,822

UNITED STATES PATENT OFFICE 2,063,822

PLANT PROTECTIVE DEVICE

Henry W. Muller, Richmond Hill, N. Y.

Application January 3, 1936, Serial No. 57,439

2 Claims. (Cl. 47—28)

This invention relates to devices directed to the protection of plants against the effect of frost and means by which the placement of such devices over a plant may be efficiently accomplished.

There exists particularly in some agricultural regions an imminent danger to new crops caused by the sudden occurrence of a frost. This danger is so disastrous that the authorities in some localities have inaugurated an extensive alarm system by which to forewarn the farmer of an approaching frost. When such an alarm is sent out the plant growers immediately proceed to protect their crops, particularly the younger plants, from the effects of the approaching frost. Such precautionary measures include the placement of a suitable protective covering over the plants until the frost has subsided.

In accordance with the above, it is the general object of my invention to provide a simple and effective covering element for the protection of plants against frost, the same being particularly adapted for economical manufacture.

Another object of my invention is to provide a novel form of cover for plants, the structure of which will permit its circumferential expansion during the placement of the cover over the plant thereby effecting the anchorage of the cover's brim into the soil surrounding the plant and thus assuring the more complete protection of the plant.

A further object of my invention resides in the provision of a simple device by which the mentioned expansion of the cover may be efficiently accomplished, which device includes means by which the cover may be fixed in its expanded form, each of these functions being accomplished by the application merely of a manual pressure exerted on the device.

The invention will be fully and comprehensively understood from a consideration of the following detailed description when read in connection with the accompanying drawings which form part of the application.

In the drawings:

Fig. 3 is a perspective view of the placement or setting device apart from the plant cover.

Fig. 4 is a side elevational view of the plant cover of my invention; and

Fig. 5 is a detail sectional view thru the brim of the cover, illustrating the form taken by same after the application of the setting device.

Figure 1:
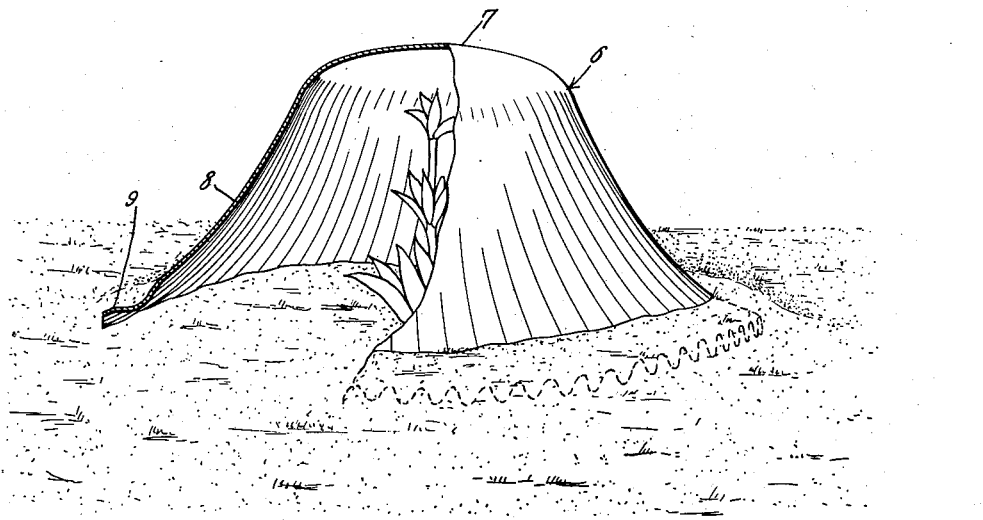
Fig. 1 is a perspective view illustrating the use of my plant cover installed over a plant, the cover being broken away in section.

Reference is now directed to the drawings for a more detailed description thereof and particularly to Figs. 1 and 4 in which the numeral 6 indicates generally the plant cover. For the purposes of description the cover 6 may be considered as consisting of several component elements, namely, a crown 7 transforming into a diverging skirt 8, the latter flaring into a circular brim 9. The entire cover 6 is preferably fabricated from a single circular piece of sheet material, such as paper stock, and embodies a bowl-like structure of which the crown 7 is preferably convex in contour so as to withstand a downward pressure.

The preferred application of my plant cover requires that the skirt 8 and brim 9 be structurally resilient to permit the circumferential expansion of the brim 9 for the purposes hereinafter described. Accordingly, the skirt 8 and brim 9 are brought into the desired form by being bent or pressed into a series of radially extending corrugations by which the circular stock comprising the cover 6 is caused to be gathered into a bowl-like structure. To accomplish this formation properly the mentioned corrugations should be tapered from a minimum at their juncture with the crown 7 to a maximum at the edge of the brim 9. It is also required that the depending skirt 8 and brim 9 be divergent from the crown 7 at a gradually increasing degree so as to terminate at the edge of the brim 9 at an acute angle from the horizontal.

Figure 2:
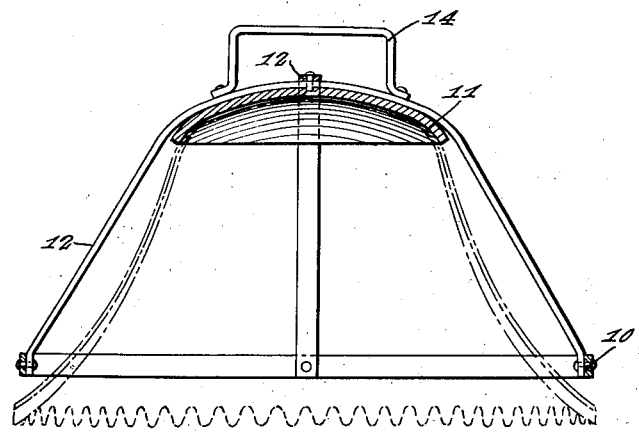
Fig. 2 is a transverse section thru the cover placement device and showing same in position on the plant cover preparatory to installing the cover firmly into place.

A detailed description of the cover placement device will now be had, during which attention is directed to Figs. 2 and 3. This device comprises mainly two elements, namely, a circular band 10 and a dome 11 supported on the band by means of a suitable frame-work such as a plurality of bars 12. The band 10 is formed of flat stock to a circular shape of a diameter approximating the outside diameter edge of the cover 6, see Fig. 2. The dome supporting bars 12 have their respective ends secured at suitable intervals to the band 10 and extend over the dome 11 to be secured thereto by suitable means such as a rivet 13. A handle 14 is disposed preferably at the top of the setting device to provide a convenient grip during the use of the latter.

The inner contour of the dome 11 is to conform substantially to the outline of the crown 7 of the cover 6 so that when a downward pressure is applied to the setting device the dome 11 will transmit this pressure to the skirt 8 of the cover 6 without effecting any distortion of the crown 7 thereof. It is to be noted here that the dome 11 is disposed centrally above the band 10 at such a distance from same that the band 10 will be disposed adjacent and spaced from the brim 9 of the cover 6 substantially as shown in Fig. 2.

The installation of the cover 6 to protect a plant against the effects of the frost and the operation of the cover placement device in setting the cover into place will now be described. The cover 6 is merely dropped into place over the plant and the setting device (Fig. 3) is placed on the cover 6 so that the dome 11 thereof rests on the crown 7 of the cover 6. A manual downward pressure is then applied, which pressure is transmitted via the dome 11 to the skirt 8 and brim 9, thereby pressing the edge of the cover 6 against the soil surrounding the plant, during which the brim 9 will be caused to expand circumferentially. At this stage some of the loose soil surrounding the cover 6 may be placed on the bordering portion of the brim 9 or the anchorage of the cover 6 into the soil may be effected by a further application of pressure so that the edge thereof is caused to be pierced into the surrounding soil. At this time the band 10 has come into contact with the brim 9, particularly the top of each of the corrugations thereof, whence the band 10 is pressed into the mentioned corrugations so as to distort or fold down the upper portion of the corrugations, substantially as shown in Fig. 5. This distortion effects an interlocking of the respective corrugations thereby preventing the subsequent contraction of the cover 6 to its normal shape. Were this contraction to be permitted it is obvious that the cover would thereby be released from its anchorage and would be consequently displaced by a slight gust of wind. It will be observed that the proper installation of the cover 6 in accordance with the detailed description herein will effect the firm placement of the cover over the plant so that the cover is held firmly by the soil surrounding the plant.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed as new is:

1. A plant protective device including a bowl-like cover having a crown and an expansible skirt proceeding from said crown, with a cover setting device comprising a dome adapted to contact said cover crown whereby to effect the expansion of said cover skirt upon application of manual pressure on said dome, and a ring spaced from and secured to said dome and adapted to contact said cover skirt during the expansion of same.

2. A plant protective device including a bowl-like cover having a crown and a radially corrugated skirt proceeding from said crown, with a cover setting device comprising a dome adapted to contact said cover crown whereby to effect the expansion of said cover skirt upon application of manual pressure on said dome, a ring spaced from and secured to said dome and adapted to distort the corrugations of said skirt to lock same in expanded condition, said ring being secured to said dome by spaced bars fastened to the ring and extending over said dome and secured thereto.

HENRY W. MULLER.